US012542996B2

(12) United States Patent
Li et al.

(10) Patent No.: US 12,542,996 B2
(45) Date of Patent: Feb. 3, 2026

(54) SPEAKER MODULE AND HEAD-MOUNTED DEVICE

(71) Applicant: GOERTEK TECHNOLOGY CO., LTD., Shandong (CN)

(72) Inventors: Jinbao Li, Shandong (CN); Jinguo Zhang, Shandong (CN)

(73) Assignee: Goertek Technology Co., Ltd., Qingdao (CN)

( * ) Notice: Subject to any disclaimer, the term of this patent is extended or adjusted under 35 U.S.C. 154(b) by 175 days.

(21) Appl. No.: 18/591,663

(22) Filed: Feb. 29, 2024

(65) Prior Publication Data

US 2024/0205594 A1 Jun. 20, 2024

Related U.S. Application Data

(63) Continuation-in-part of application No. PCT/CN2022/113492, filed on Aug. 19, 2022.

(30) Foreign Application Priority Data

Aug. 31, 2021 (CN) ......................... 202111014742.6

(51) Int. Cl.

| | |
|---|---|
| ***H04R 1/40*** | (2006.01) |
| ***H04R 1/02*** | (2006.01) |
| ***H04R 7/04*** | (2006.01) |

(52) U.S. Cl.

CPC ............. *H04R 1/403* (2013.01); *H04R 1/025* (2013.01); *H04R 7/04* (2013.01); *H04R 2499/11* (2013.01)

(58) Field of Classification Search

CPC .......... H04R 1/403; H04R 1/025; H04R 7/04; H04R 2499/11

USPC ........................................................ 381/71.7

See application file for complete search history.

(56) References Cited

U.S. PATENT DOCUMENTS

| | | | | |
|---|---|---|---|---|
| 2008/0205682 A1* | 8/2008 | Jenkins | H04R 1/2834 381/349 |
| 2015/0110329 A1* | 4/2015 | Tanaka | H04R 1/1016 381/380 |
| 2019/0141452 A1* | 5/2019 | Chang | H04R 9/02 |

FOREIGN PATENT DOCUMENTS

| | | |
|---|---|---|
| CN | 112118339 A | 12/2020 |
| CN | 113225643 A | 8/2021 |
| CN | 113784243 A | 12/2021 |

* cited by examiner

*Primary Examiner* — Sean H Nguyen

(74) *Attorney, Agent, or Firm* — Baker Botts LLP

(57) ABSTRACT

A speaker module and a head-mounted device are disclosed. The speaker module includes a bracket, a first speaker fixedly provided on a first surface of the bracket and a second speaker fixedly provided on a second surface of the bracket, and the first surface and the second surface are non-coplanar. The first speaker has a first diaphragm with a first rear sound cavity on one side thereof proximate to the bracket, and the first speaker has a first sound leakage hole in communication with the first rear sound cavity, and a centerline of the first sound leakage hole is parallel to the first surface of the bracket. The second speaker has a second diaphragm with a second rear sound cavity on one side thereof proximate to the bracket.

20 Claims, 2 Drawing Sheets

SPEAKER MODULE AND HEAD-MOUNTED DEVICE

CROSS-REFERENCE TO RELATED APPLICATIONS

This application is a continuation-in-part of International Application No. PCT/CN2022/113492, filed on Aug. 19, 2022, which claims priority to Chinese Patent Application No. 202111014742.6, filed on Aug. 31, 2021, both of which are hereby incorporated by reference in their entireties.

TECHNICAL FIELD

The present application relates to the field of far-field muffling technologies and, in particular to a speaker module and a head-mounted device.

BACKGROUND

In the prior art, all electronic devices equipped with sound systems generate a lot of to a large extent when using the sound systems designed under open-field. For example, when a cell phone is answering a call, the sound from the speakers inside the cell phone spreads to surrounding areas, or when a head-mounted device such as AR/VR/MR/audio glasses is in use, the sound played by the speakers inside the device spreads to surrounding areas.

Sound systems in open-field/far-field situations can create sound-leaking problems, which can result in the leakage of private personal information, while the leaked sound can cause sound pollution to the surrounding environment.

SUMMARY

The present application intends to provide a speaker module and a head-mounted device, to solve the problem that the existing device cannot provide favorable conditions for the problem of far-field sound leakage.

The present application provides a speaker module comprising the following steps:

In a first aspect, the present application provides a speaker module comprising:

- a bracket, a first speaker and a second speaker, the first speaker is fixedly provided on a first surface of the bracket, the second speaker is fixedly provided on a second surface of the bracket, the first surface of the bracket and the second surface of the bracket are non-coplanar;
- the first speaker has a first diaphragm with a first rear sound cavity on one side thereof proximate to the bracket, the first speaker has a first sound leakage hole in communication with the first rear sound cavity, and a centerline of the first sound leakage hole is parallel to the first surface of the bracket;
- the second speaker has a second diaphragm with a second rear sound cavity on one side thereof proximate to the bracket.

Optionally, the first diaphragm and the second diaphragm are of the same structure, material, size and elastic modulus.

Optionally, the second rear sound cavity is smaller in volume than the first rear sound cavity.

Optionally, the bracket is a plate-like structure, the first speaker and the second speaker are respectively provided on two sides of the bracket, and the positions of the first speaker and the second speaker are opposite each other on the bracket.

Optionally, the bracket is a plate-like structure, the first diaphragm is provided parallel to the bracket, and the second diaphragm is provided parallel to the bracket.

Optionally, a sidewall of the first speaker is perpendicular to the bracket, and the first sound leakage hole is provided in the sidewall of the first speaker.

Optionally, the second speaker has a second sound leakage hole, the second sound leakage hole which is communicating with the second rear sound cavity, and the second sound leakage hole is of a smaller aperture than the first sound leakage hole.

Optionally, the first speaker and the second speaker are moving-coil type speakers, and an overall thickness of the first speaker, the bracket and the second speaker is less than or equal to 5 mm.

Optionally, the first speaker and the second speaker are piezoelectric thin-film type speakers, and an overall thickness of the first speaker, the bracket and the second speaker is less than or equal to 3 mm.

In a second aspect, the present application provides a head-mounted device comprising a housing and the speaker module described above, the speaker module is provided in the housing;

- the first diaphragm forms a first front sound cavity on one side distal to the bracket, the second diaphragm forms a second front sound cavity on one side distal to the bracket, the housing is provided with a first sound emission hole in communication with the first front sound cavity, a second sound emission hole in communication with the second front sound cavity and an external sound leakage hole in communication with the first sound leakage hole; wherein,
- the sound waves emitted from the second sound emission hole and the sound waves emitted from the external sound leakage hole are respectively superimposed with the sound waves emitted from the first sound emission hole at a muffling position, such that the sound waves emitted from the second sound emission hole and the sound waves emitted from the outgoing sound hole are respectively canceled out with at least a portion of the sound waves emitted from the first sound emission hole at the muffling position.

One technical effect of the application is that, the speaker module of the present application can simultaneously emit a first sound wave emitted by a first speaker, a second sound wave emitted by a second speaker, and a third sound wave passing through a first sound leakage hole, and the first sound wave, the second sound wave, and the third sound wave can cancel out each other in the far-field under a certain condition. Therefore, the present application provides favorable conditions for solving the problem of the sound leakage in the open field/far-field.

Other features of the present application and advantages thereof will become clear by the following detailed description of exemplary embodiments of the present application with reference to the accompanying drawings.

BRIEF DESCRIPTION OF THE DRAWINGS

The accompanying drawings which are incorporated in and form part of the specification, illustrate embodiments of the present application, and are used, together with their illustration, to explain the principles of the present application.

REFERENCE SIGNS

1: bracket; 2: first speaker; 3: second speaker; 4: first diaphragm; 5: first rear sound cavity; 6: first sound leakage hole; 7: second diaphragm; 8: second rear sound cavity.

DETAILED DESCRIPTION

Various exemplary embodiments of the present disclosure will now be described with reference to the accompanying drawings. It is to be noted that unless otherwise specified, the scope of present disclosure is not limited to relative arrangements, numerical expressions and values of components and steps as illustrated in the embodiments.

Description to at least one exemplary embodiment is for illustrative purpose only, and in no way implies any restriction on the present disclosure or application or use thereof.

Techniques, methods and devices known to those skilled in the prior art may not be discussed in detail; however, such techniques, methods and devices shall be regarded as part of the description where appropriate.

In all the examples illustrated and discussed herein, any specific value shall be interpreted as illustrative rather than restrictive. Different values may be available for alternative examples of the exemplary embodiments.

It is to be noted that similar reference numbers and alphabetical letters represent similar items in the accompanying drawings. In the case that a certain item is identified in a drawing, further elaboration thereof may be omitted in the subsequent drawings.

Figure 1:
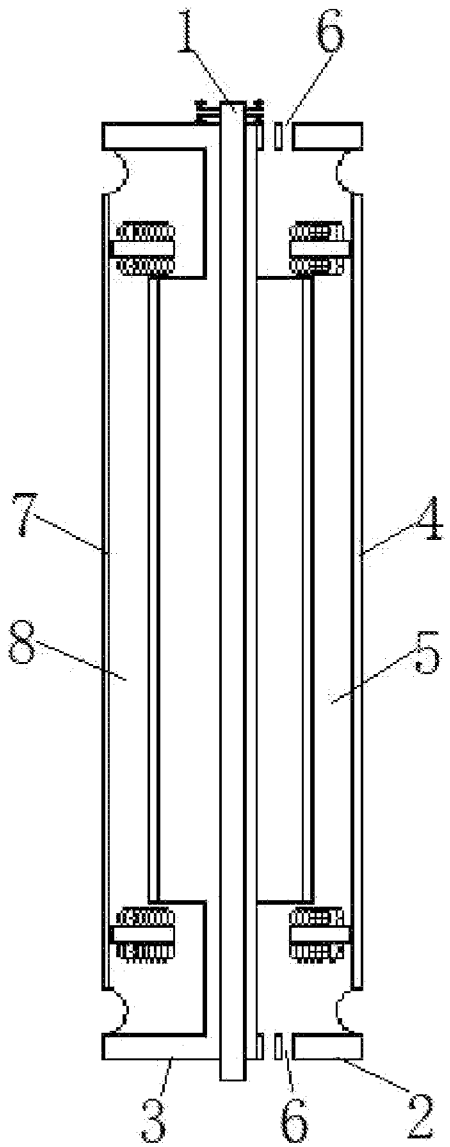
FIG. 1 is a schematic diagram of a first embodiment of the speaker module provided in the present application.
Figure 2:
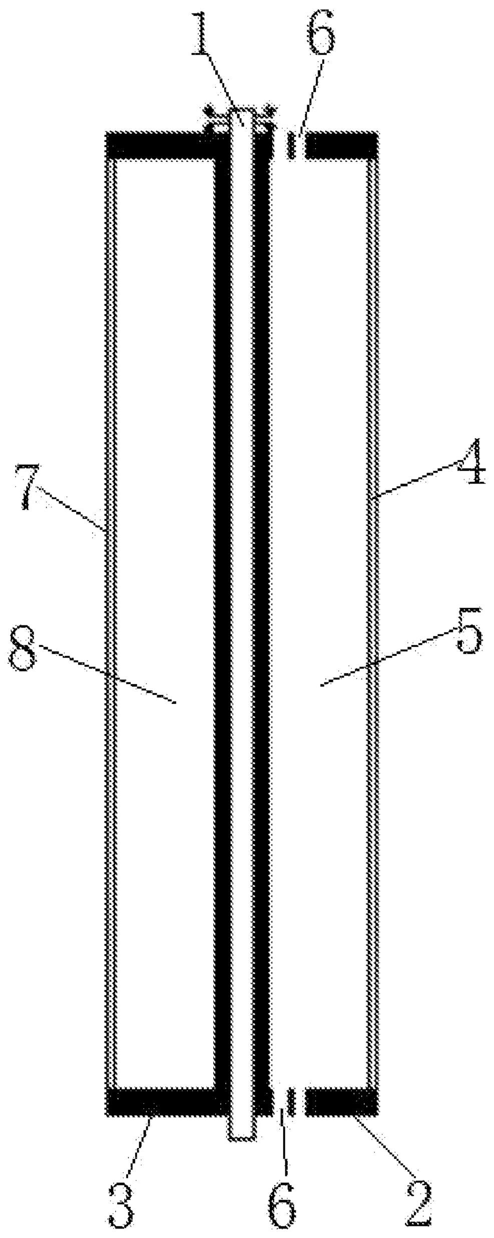
FIG. 2 is a schematic diagram of a second embodiment of the speaker module provided in the present application.

In a first aspect, as shown in FIGS. 1 and 2, the present application provides a speaker module comprising a bracket 1, a first speaker 2 and a second speaker 3. The first speaker 2 is fixedly provided on a first surface of the bracket 1, the second speaker 3 is fixedly provided on a second surface of the bracket 1, and the first surface of the bracket 1 and the second surface of the bracket 1 are non-coplanar. The bracket 1 play a supporting role, and the bracket 1 can be fixedly provided within the device in which the present application is installed. The bracket 1 can be a structure within the device in which the present application is installed. For example, the device in which the speaker module of the present application is installed has a housing with a bracket 1 being integral therewith and extending from inside thereof to outside thereof, the first speaker 2 and the second speaker 3 can be provided on the bracket 1 being integral therewith and extending from inside thereof to outside thereof; or a circuit board is provided within the housing, the circuit board may be the bracket 1, the first speaker 2 and the second speaker 3 may be provided on the circuit board. Meanwhile the bracket 1 has a first surface and a second surface which are non-coplanar. Providing the first speaker 2 on the first surface and the second speaker 3 on the second surface, facilitating providing a sound channel structure which transmitting the sound waves emitted by the first speaker 2 and the second speaker 3 for the device installed with the speaker module of the present application. While ensuring that the design of the sound channel structure maximizes the assistance of the application in achieving better muffling effects, it is also beneficial for simplifying the sound channel structure. For example, the bracket can enable the first speaker 2 and the second speaker 3 to be separated by a certain distance, so as to enable a better muffling effect with a shorter sound channel structure. At the same time, the sound channel structure in the device installed with the speaker module of the present application is reasonably distributed, avoiding the sound channel structure being concentrated in a certain area, which leads to a complex sound channel structure and thus makes it difficult to manufacture the sound channel structure.

The first speaker 2 has a first diaphragm 4 which vibrates and emits sound, and one side of the first diaphragm 4 distal to the bracket 1 is a first sound emitting side. The first sound emitting side of the first speaker 2 is capable of emitting a first sound wave, which is the sound wave emitted from the speaker module of the present application and is capable of being received by a user. The first diaphragm 4 has a first rear sound cavity 5 on one side thereof proximate to the bracket 1, and the first rear sound cavity 5 is also capable of forming sound waves when the first diaphragm 4 vibrates. The first speaker 2 has a first sound leakage hole 6 in communication with the first rear sound cavity 5. The sound waves formed in the first rear sound cavity 5 are capable of transmitting through the first sound leakage hole 6, and sound waves transmitted through the first sound leakage hole 6 are a third sound wave. Here, the centerline of the first sound leakage hole 6 is parallel to the first surface of the bracket 1, facilitating the communication of the first sound leakage hole 6 with the sound channel structure provided within the device in which the speaker module of the present application is installed, thereby enabling the third sound wave emitted from the first sound leakage hole 6 to be transmitted to outside through the sound channel structure, or the first sound leakage hole 6 is not in communication with the sound channel structure, the centerline of the first sound leakage hole 6 is parallel to the first surface of the first surface of the support 1, which can also facilitate the transmission of the third sound wave emitted from the first sound leakage hole 6 to outside.

Here the first speaker 2 may comprise a first base plate, a first annular wall, a first diaphragm 4 and a driving assembly of the first diaphragm 4. The first base plate is provided in an opening on one side of the first annular wall, and one side of the first base plate distal to the annular wall is fixedly mounted to the bracket 1. The driving assembly of the first diaphragm 4 is located within the first annular wall, and is fixedly provided on the first base plate. An edge portion of the first diaphragm 4 is provided in an opening at the other side of the first annular wall, and the first diaphragm 4 is capable of vibrating and emitting sound when driven by the drive assembly of the first diaphragm 4. At this point, the first rear sound cavity 5 is enclosed by the first diaphragm 4, the first annular wall and the first base plate together.

Further, the first speaker 2 may not have a first base plate. The opening at the first end of the first annular wall is fixedly provided on the bracket 1, and the drive assembly of the first diaphragm 4 is fixedly provided on the bracket 1. At this point, the first rear sound cavity 5 is enclosed by the diaphragm, the first annular wall and the bracket 1 together. Of course, the first speaker 2 may be of other structures, which are not specifically limited herein.

The second speaker 3 has a second diaphragm 7 which vibrates and emits sound, and one side of the second diaphragm 7 distal to the bracket 1 is a second sound emitting side. The second sound emitting side of the second speaker 3 is capable of emitting a second sound wave, which is a sound wave emitted by the speaker module of the present application and is capable of canceling out with the first sound wave. The second diaphragm 7 has a second rear sound cavity 8 on one side thereof proximate to the bracket 1, which is capable of ensuring the sound emitting performance of the second speaker 3.

Here the second speaker 3 may comprise a second base plate, a second annular wall, a second diaphragm 7 and a driving assembly of the second diaphragm 7. The second base plate is provided in an opening on one side of the second annular wall, one side of the second base plate distal to the annular wall is fixedly mounted to the bracket 1. The driving assembly of the second diaphragm 7 is located within the second annular wall, and is fixedly provided on the second base plate. An edge portion of the second diaphragm 7 is provided in an opening at the other side of the second annular wall, and the second diaphragm 7 is capable of vibrating and emitting sound when driven by the drive assembly of the second diaphragm 7. At this point, the second rear sound cavity 8 is enclosed by the second diaphragm 7, the second annular wall and the second base plate together.

Further, the second speaker 3 may not have a second base plate. The opening at the first end of the second annular wall is fixedly provided on the bracket 1, and the drive assembly of the second diaphragm 7 is fixedly provided to the bracket 1. At this point, the second rear sound cavity 8 is enclosed by the second diaphragm 7, the second annular wall and the bracket 1. Of course, the second speaker 3 may be of other structures, which are not specifically limited herein.

The speaker module of the present application is capable of simultaneously emitting a first sound wave emitted by the first speaker 2, a second sound wave emitted by the second speaker 3, and a third sound wave through the first sound leakage hole 6. While the first sound wave, the second sound wave, and the third sound wave are capable of canceling out each other in the far field under certain conditions, and thus the present application provides an advantageous condition for solving the problem of sound leakage in the far field of the open field.

The bracket 1 is a separate component, and the first speaker 2 and the second speaker 3 are fixedly provided on the bracket 1. The first speaker 2, the bracket 1 and the second speaker 3 as a whole are capable of being installed in the housing in which the device of the present application is installed. That is to say, the present application can be provided modularly, which is convenient for installation and maintenance. At the same time, the present application integrates the first speaker 2, the bracket 1 and the second speaker 3 into a one-piece structure, avoiding the situation that the first speaker 2 and the second speaker 3 are dispersed to occupy most of the space. The present application can save installing space, and it is beneficial for the miniaturization development of the device equipped with the present application.

Optionally, the first diaphragm 4 and the second diaphragm 7 have the same structure, material, size and elastic modulus to ensure that the first diaphragm 4 and the second diaphragm 7 have the same vibration frequency. Further, the first sound wave emitted by the first diaphragm 4, the third sound wave emitted through the first sound leakage hole 6 and the second sound wave emitted by the second diaphragm 7 have the same or similar waveforms, and then the first, second and third sound waves can be maximally canceled out under certain conditions, sound waves and the third sound waves can be canceled out under certain conditions to the most extent. For example, the first, the second and the third sound waves have the same or similar waveforms, the phase of the first sound wave is opposite to the phase of the second sound wave and the third sound wave, the first sound wave is superimposed with the second sound wave and the third sound, respectively, and the first, the second and the third sound waves are canceled out at the overlapping position, so as to realize the purpose of far-field muffling. Specifically, when the first sound wave and the second sound wave are at a distance of 300 mm from an outlet side of the first speaker 2, the second sound wave can form a noise reduction effect for the sound leakage with attenuation of more than 40 dB to the first sound wave in a range between 20 HZ and 1 KHZ.

Further, the first speaker 2 is identical to the second speaker 3, which can further ensure that the device with the present application has a better far-field muffling effect.

Optionally, the second rear sound cavity 8 is smaller in volume than the first rear sound cavity 5, which ensures that the volume of the second rear sound cavity 8 is small, reduces the occupied space of the second speaker 3, ensures that the overall speaker module has a moderate volume, and further ensures that the device with the present application can be miniaturized in design. At the same time, although the second sound wave cancels out the sound wave having wider frequency band in the first sound wave, the second sound wave does not cancel out the sound wave with the high frequency band in the first sound wave. The second rear sound cavity 8 with small volume enables the second sound wave emitted by the second speaker 3 to have a higher frequency, and therefore the second sound wave is just capable of canceling out the sound wave with high frequency band in the first sound wave, which further ensures the far-field muffling effect under open-field of the present application.

Optionally, the bracket 1 is a plate-like structure. The first speaker 2 and the second speaker 3 are respectively provided on two sides of the bracket 1, and a position of the first speaker 2 on the bracket 1 corresponds to that of the second speaker 3 on the bracket 1, which is capable of making the structure of the speaker module of the present application more compact, and ensures the speaker module of the present application to occupy less space. Further, in the case where the first speaker 2 and the second speaker 3 are respectively provided on two sides of the plate-like bracket 1 and are positioned in correspondence to each other, the first diaphragm 4 and the second diaphragm 7 are ensured to have the same vibration frequency, which can make the speaker module of the present application work more stably, and is further beneficial to the far-field muffling.

Optionally, the first speaker 2 and the second speaker 3 may be provided on the same side of the plate-like bracket 1. Alternatively, the first speaker 2 and the second speaker 3 may be provided on different sides of the bracket 1, but the position of the first speaker 2 on the bracket 1 is different from the position of the second speaker 3 on the bracket 1. The specific position relationship for mounting the first speaker 2 and the second speaker 3 may be based on the actual installation environment of the speaker module of the present application. For example, since the housing space of the device to be installed with the present application is limited, the first speaker 2 and the second speaker 3 can only be installed on the same side of the plate-like bracket 1.

Optionally, the bracket 1 is a plate-like structure, the first diaphragm 4 is provided parallel to the bracket 1, and the second diaphragm 7 is provided parallel to the bracket 1. This enables the speaker module of the present application to have better stability during operation and ensures the sound-producing effect. At the same time, the first diaphragm 4 and the second diaphragm 7 are parallel to the bracket 1 respectively, which can fully utilize the space of the first speaker 2 and the second speaker 3, and make the first speaker 2 and the second speaker 3 respectively have a first rear sound cavity 5 and a second rear sound cavity 8 which are used fully, and can avoid the first speaker 2 and the second speaker 3 from occupying extra space, and further ensures the miniaturized design of the application.

Optionally, a side wall of the first speaker 2 is perpendicular to the bracket 1, and the first sound leakage hole 6 is provided on the side wall of the first speaker 2. When designing a pathway between the first sound leakage hole 6 and outside, it is convenient to design the pathway to communicate the first sound leakage hole 6 with the outside. This avoids the first sound leakage hole 6 from locating at a position that is not easy to be in communication with the outside, and the difficulty of manufacture and installation are reduced.

Optionally, the second speaker 3 has a second sound leakage hole in communication with the second rear sound cavity 8. The second sound leakage hole is of an aperture smaller than the first sound leakage hole 6. Here the second sound leakage hole is only used to play the role of balancing the second rear sound cavity 8 and the external air pressure, so as to enable the second diaphragm 7 to have better vibrational performance, and it is not necessary to transmit the sound wave through the second sound leakage hole. Therefore, the aperture of the second sound leakage hole is smaller than the aperture of the first sound leakage hole 6.

Optionally, as shown in FIG. 1, the first speaker 2 and the second speaker 3 are moving-coil type speakers, and the overall thickness of the first speaker 2, the bracket 1, and the second speaker 3 is less than or equal to 5 mm. The present application has a small thickness for facilitating to being integrated within the device.

Optionally, as shown in FIG. 2, the first speaker 2 and the second speaker 3 are piezoelectric thin-film type speakers, and the overall thickness of the first speaker 2, the bracket 1, and the second speaker 3 is less than or equal to 3 mm. The overall thickness of the speaker module of the present application is further reduced, and can be set up within devices with high thickness requirements.

Further, the first speaker 2 and the second speaker 3 may also comprise a piezoelectric MEMS speaker, a moving iron type speaker, and the like.

In a first aspect, the present application provides a head-mounted device comprising a housing and the speaker module described above, which is provided within the housing;

- the first diaphragm 4 forms a first front sound cavity on one side distal to the bracket 1, the second diaphragm 7 forms a second front sound cavity on one side distal to the bracket 1, the housing is provided with a first sound emission hole in communication with the first front sound cavity, a second sound emission hole in communication with the second front sound cavity, and an external sound leakage hole in communication with the first sound leakage hole 6; wherein,
- the sound waves emitted from the second sound emission hole and the sound waves emitted from the external sound leakage hole are respectively superimposed with the sound waves emitted from the first sound emission hole at a muffling position, such that the sound waves emitted from the second sound emission hole and the sound waves emitted from the external sound leakage hole are respectively canceled out with at least a portion of the sound waves emitted from the first sound emission hole at the muffling position to ensure a far-field muffling effect of the headwear device.

Here, there may be provided one muffling position. At this time, the muffling position is a region where sound waves emitted from the first sound emission hole, sound waves emitted from the second sound emission hole and sound waves emitted from the sound leakage hole are superimposed. The sound waves emitted from the first sound emission hole, the sound waves emitted from the second sound emission hole and the sound waves emitted from the external sound leakage hole cancel out each other at the region, to achieve the muffling effect. There may be two muffling positions, including a first muffling position and a second muffling position. The first muffling position is the region where the sound waves emitted from the first sound emission hole and the sound waves emitted from the external sound leakage hole overlap. The second muffling position is the region where the sound waves emitted from the first sound emission hole having been canceled out by the sound wave emitted from the external sound leakage hole overlap with the sound waves emitted from the second sound emission hole.

The head-mounted device comprises AR/VR/MR/audio glasses. The AR/VR/MR/audio glasses comprises a frame and a temple, and one end of the temple is provided on the frame. The speaker device for muffling is provided on the temple. The temple is the housing. One side of the temple facing the frame is a first side, one side of the temple distal to the first side is a second side, one side of the temple adjacent to the first side and facing the human's ear is a third side, and one side of the temple distal to the third side is a fourth side. The speaker module of the application is provided in the temple, the first sound emission hole is provided on the third side of the temple, the external sound leakage hole is provided on both side of the first sound emission hole along the extending direction of the third side of the temple, and the external sound leakage hole is provided on the second side. Providing the first sound emission hole on one side of the temple facing the human's ear can prevent sound from escaping and ensure the wearer's listening effect. The external sound leakage holes are provided on both sides of the first sound leakage holes, so that the external sound leakage holes surround the first sound leakage holes to ensure the muffling effect of the product of the present application. The external sound leakage holes are provided along the extending direction of the third side of the temple, so that the first sound leakage hole and the external sound leakage holes are provided to be fixed to the structure of the temple better. That is to say, the distribution of the holes on the structure is reasonable, and the muffling can be guaranteed. The external sound leakage holes provided on the second side of the temple can cooperate with the external sound leakage holes provided on the third side of the temple, to achieve better muffling effect. The second side of the temple and the fourth side of the temple are provided with second sound emission holes, and the number of the second sound emission holes provided on the second side of the temple is smaller than the number of the second sound emission holes provided on the fourth side of the temple. The reason is that the second side of the temple is the side of the temple that is nearly parallel to the face facing outward when the glasses are being worn, and the sound waves emitted from the second sound emission holes provided on the second side of the temple can play a major role in muffling effect. While the fourth side of the temple is the side of the temple facing the sky, and the second sound emission holes provided on the fourth side of the temple only play the auxiliary role in muffling effect, such that the positions and the number of the second sound emission holes are distributed scientifically and reasonably.

Further, the temple may comprise a first half-casing and a second half-casing, and the first half-casing and the second half-casing 1 are snapped together to form the housing. At this point the speaker module of the present application may be provided in the first half-casing, or provided in the second half-casing, or provided in both the first half-casing and the second half-casing.

Although the present disclosure has been described in detail in connection with some specific embodiments by way of illustration, those skilled in the art should understand that the above examples are provided for illustration only and should not be taken as a limitation on the scope of the disclosure. Those skilled in the art will appreciate that modifications may be made to the above embodiments without departing from the scope and spirit of the present disclosure. We therefore claim as our disclosure all that comes within the scope of the appended claims.

The invention claimed is:

1. A speaker module, comprising a bracket, a first speaker, and a second speaker, wherein the first speaker is fixedly provided on a first surface of the bracket, the second speaker is fixedly provided on a second surface of the bracket, wherein the first surface of the bracket and the second surface of the bracket are non-coplanar;

the first speaker comprises a first diaphragm with a first rear sound cavity on one side thereof proximate to the bracket, the first speaker and a first sound leakage hole in communication with the first rear sound cavity; and the second speaker comprises a second diaphragm with a second rear sound cavity on one side thereof proximate to the bracket.

2. The speaker module according to claim 1, wherein the first diaphragm and the second diaphragm comprise diaphragms having the same structure, material, size, and elastic modulus.

3. The speaker module according to claim 1, wherein the second rear sound cavity is smaller in volume than the first rear sound cavity.

4. The speaker module according to claim 1, wherein the bracket comprises a plate-like structure, the first speaker and the second speaker are respectively provided on two sides of the bracket, and a position of the first speaker on the bracket corresponds to that of the second speaker on the bracket.

5. The speaker module according to claim 4, wherein a sidewall of the first speaker is perpendicular to the bracket, and the first sound leakage hole is provided on the sidewall of the first speaker.

6. The speaker module according to claim 4, wherein the first speaker and the second speaker comprise moving-coil type speakers, and a total thickness of the first speaker, the bracket, and the second speaker is less than or equal to 5 mm.

7. The speaker module according to claim 4, wherein the first speaker and the second speaker comprise piezoelectric thin-film type speakers, and a total thickness of the first speaker, the bracket, and the second speaker is less than or equal to 3 mm.

8. The speaker module according to claim 1, wherein the bracket comprises a plate-like structure, the first diaphragm is provided parallel to the bracket, and the second diaphragm is provided parallel to the bracket.

9. The speaker module according to claim 1, wherein the second speaker comprises a second sound leakage hole in communication with the second rear sound cavity, and the second sound leakage hole comprises an aperture smaller than that of the first sound leakage hole.

10. A head-mounted device, comprising a housing and a speaker module according to claim 1, wherein the speaker module is provided in the housing; and the first diaphragm forms a first front sound cavity on one side thereof distal to the bracket, the second diaphragm forms a second front sound cavity on one side thereof distal to the bracket.

11. The head-mounted device according to claim 10, wherein the housing is provided with:

a first sound emission hole in communication with the first front sound cavity;

a second sound emission hole in communication with the second front sound cavity; and an external sound leakage hole in communication with the first sound leakage hole.

12. The head-mounted device according to claim 10, wherein the speaker module further comprises a shell provided inside the housing and is separated therefrom, the shell enclosing the first front sound cavity and/or the second front sound cavity; and wherein the housing is provided with a first sound emission hole in communication with the first front sound cavity, a second sound emission hole in communication with the second front sound cavity, and an external sound leakage hole in communication with the first sound leakage hole.

13. The head-mounted device according to claim 10, further comprising a muffling position including a region where sound waves emitted from the first sound emission hole, from the second sound emission hole, and from the sound leakage hole are superimposed.

14. The head-mounted device according to claim 10, further comprising two muffling positions, including a first muffling position and a second muffling position;

the first muffling position is comprises a region where sound waves emitted from the first sound emission hole and from the external sound leakage hole overlap; and the second muffling position comprises a region where sound waves emitted from the first sound emission hole and canceled out by the sound wave emitted from the external sound leakage hole overlap with sound waves emitted from the second sound emission hole.

15. The head-mounted device according to claim 10, wherein the head-mounted device comprises an AR/VR/MR/audio glasses comprising a frame and a temple with one end thereof provided on the frame, and the temple comprises the housing, a first side facing the frame, a second side of the temple distal to the first side, a third side adjacent to the first side and facing the human's ear, and a fourth side distal to the third side; and the first sound emission hole is provided on the third side of the temple, the external sound leakage hole is provided on both sides of the first sound emission hole along the extending direction of the third side of the temple;

the second side and the fourth side of the temple are provided with second sound emission boles, and the number of the second sound emission boles provided on the second side of the temple is smaller than the number of the second sound emission holes provided on the fourth side of the temple.

16. The speaker module according to claim 1, wherein a centerline of the first sound leakage hole is parallel to the first surface of the bracket.

17. The speaker module according to claim 1, wherein the housing is provided therein with a bracket being integral therewith and extending from inside thereof to outside thereof, the first speaker and the second speaker being provided on the bracket; or the housing is provided therein with a bracket being formed of a circuit board and extending from inside of the housing to outside thereof, the first speaker and the second speaker being provided on the bracket.

18. The speaker module according to claim 1, wherein the first speaker comprises a first base plate, a first annular wall, a first diaphragm, and a driving assembly of the first diaphragm.

19. The speaker module according to claim 1, wherein the first diaphragm and the second diaphragm are of the same in vibration frequency.

20. The speaker module according to claim 1, wherein the first speaker and the second speaker are provided on the same side of the bracket; or the first speaker and the second speaker are provided on different sides of the bracket.

* * * * *